United States Patent [19]

Kain

[11] Patent Number: 5,754,291
[45] Date of Patent: May 19, 1998

[54] MICRO-IMAGING SYSTEM

[75] Inventor: Robert C. Kain, Cupertino, Calif.

[73] Assignee: Molecular Dynamics, Inc., Sunnyvale, Calif.

[21] Appl. No.: 716,858

[22] Filed: Sep. 19, 1996

[51] Int. Cl.[6] .................................................. G01N 21/00
[52] U.S. Cl. ........................... 356/338; 356/338; 356/344; 356/318
[58] Field of Search ................................ 356/344, 338, 356/318

[56] References Cited

U.S. PATENT DOCUMENTS

| | | | |
|---|---|---|---|
| 1,777,262 | 9/1930 | Hasselkus et al. | 359/771 |
| 4,680,635 | 7/1987 | Khurana | 358/211 |
| 4,755,874 | 7/1988 | Esrig et al. | 358/106 |
| 5,034,613 | 7/1991 | Denk | 356/318 |
| 5,141,609 | 8/1992 | Sweedler et al. | 204/180.1 |
| 5,294,323 | 3/1994 | Togusari et al. | 204/299 R |
| 5,296,700 | 3/1994 | Kumagai | 250/216 |
| 5,500,770 | 3/1996 | Zinter et al. | 359/793 |

*Primary Examiner*—Frank G. Font
*Assistant Examiner*—Reginald A. Ratliff
*Attorney, Agent, or Firm*—Thomas Schneck

[57] ABSTRACT

The present invention features two flat-field, telecentric, infinite conjugate, achromatic objectives each of which has an external pupil lying in a common plane located equidistant from the two objectives, defining a mechanically accessible central pupil of an imaging system centered in the common plane. Each of the objectives are afocal in the common plane, with one of the lenses forming a focal plane proximate to a sample. The lenses are adapted to provide varying levels of magnification while keeping constant the number of resolvable points in the field of view. An array detector is positioned proximate to a focal plane formed of the remaining objective lens. The double objective lens assembly is described as being included in transillumination and epi-illumination systems.

19 Claims, 5 Drawing Sheets

MICRO-IMAGING SYSTEM

TECHNICAL FIELD

The present invention relates to microscopy. Specifically, the present invention pertains to an imaging system ideally suited for full-field imaging.

BACKGROUND ART

Light microscopes have emerged as a powerful tool for investigating samples at submicron resolution in many fields of application using various imaging techniques, e.g., epi-illumination, reflection or transillumination imaging. In biology and medicine, appropriate tags, such as fluorescent and immunofluorescent tags, are used to signal the presence and location of selected molecular species with exceptionally high sensitivity. Dynamic behavior of specimens may be visualized in a natural environment by employing electronically-enhanced video microscopy.

Moreover, computer chips and related information-processing and storage devices have spurred new developments in light microscopy. For example, U.S. Pat. No. 4,680,635 to Khuruna discloses an emission microscope for monitoring anomalies, such as pattern defects and particulate contamination, during the manufacture of semiconductor wafers. The emission microscope includes, in pertinent part, an objective lens system optically coupled to an image intensifier. The image intensifier is electronically coupled to a solid state detector and functions to magnify the image detected by the objective lens. An image processing computer is coupled to receive the information produced by the solid state detector. A lens system is optically coupled to a detector. The detector is electronically coupled to a processor. The lens system comprises of an objective lens having both high numerical aperture and high magnification. To increase the brightness of an image impinging upon the detector, a secondary lens is employed to reduce the overall magnification of the lens system. Information corresponding to the image sensed by the detector is sent to the processor, whereby a visual display of the information may be obtained. Various lens systems may be provided to afford different magnifications.

U.S. Pat. No. 5,500,770 to Zinter et al. discloses a macrolens system for an emission microscopy instrument which includes two multiple lens groups. One group is disposed proximate to a sample, defining the object group. The remaining group is disposed proximate to a detector, defining a detector group. The object group is spaced apart from the detector group, forming an axial gap therebetween. The object group defines a focal plane proximate to the sample, and the detector group defines a focal plane proximate to the detector. Light from the sample passes through the object group and enters the axial gap. The object group collimates the light from the sample so that light passes through the axial gap as a bundle of collimated rays. The collimated light enters the detector group which focuses the light onto the detector. The axial gap is discussed as providing the advantage of allowing the inclusion of auxiliary components therein, such as a beam splitter.

Two conflicting goals of light microscopy inspection systems concern providing a high speed imaging system with high resolution. Typically, the resolution of a light microscope is inversely proportional to the imaging speed. Thus, the greater the resolution, the lower the inspection rate. One technique to accommodate the aforementioned conflict is to selectively choose the resolution of the system. To that end, providing a light microscope with varying magnification is beneficial.

U.S. Pat. No. 4,755,874 to Esrig et al. discloses an emission microscopy system that provides image processing techniques at both visible wavelengths and near infra-red wavelengths of light. The system includes, in pertinent part, a lens assembly optically coupled to both a sample under test and a light intensifier. A primary video camera, or other solid state optical-to-electronic analog converter, is in optical communication with the intensifier. A video image signal processing means is in electrical communication with the video camera to process information corresponding to the image sensed by the camera. A display means is electronically coupled to the processing means to form a visual display of the information processed by the processing means. The lens assembly is described as including micro-optics and macro-optics, each of which may be interchanged to provide the system differing levels of magnification. In one embodiment, the macro-optics are shown as including back-to-back photo lenses.

U.S. Pat. No. 5,141,609 to Sweedler et al. discloses a detection method and apparatus useful in capillary electrophoresis and capillary chromatography that employs an array of solid state detectors, such as a charge-coupled device (CCD). The system is described as operating in a time delay integration (TDI) mode which allows more exposure time of moving analyte zones. The CCD is a two-dimensional array which affords area-wise imaging by employing a spectrograph which disperses the image of a sample spectrally. In this manner, spatial information is collected along a first axis of the CCD array, with the spectral information being collected along a second axis of the CCD array, orthogonal to the first axis. A laser is focused via a lens axially into a capillary housing the sample. Light, transmitted from the sample, is reflected by a cylindrical mirror onto a pair of achromats and cylindrical lenses which image the light from the sample onto the CCD via the spectrograph.

A drawback with the aforementioned systems is that each sacrifices image resolution or collection efficiency in order to provide differing levels of magnification. Another drawback is that each prior art imaging system is suitable for use with only a limited number of microscopic techniques and is not optimized to provide maximum field size with maximum resolution and collection efficiency as well as providing quantitative information.

What is needed is an optical system that provides high-resolution imaging at varying degrees of magnification to afford quantitative imaging over the entire field of view and is suitable for use with many different microscopic techniques.

SUMMARY OF THE INVENTION

The present invention features a double objective lens assembly which provides a constant image definition so that a number of resolvable points across the field correspond to a number of pixel elements of a detector. The lens assembly includes two telecentric, infinite conjugate, flat field achromatic objectives, each of which has an external pupil lying in a common plane and axially aligned, defining a mechanically accessible central pupil of an imaging system. Each of the objectives are afocal in the common plane, with one of the lenses, the sample lens, forming a focal plane proximate to a sample. An array detector is positioned proximate to a focal plane formed by the remaining objective, defining the detector lens. Typically, a dimension along one axis (d) of the array detector matches a corresponding dimension (D) along a parallel axis of the sample and the central pupil (p)

at unity magnification. In this fashion, a full-field view of the sample along D may be obtained by impinging light upon the same to illuminate a scan line thereon. High definition imaging is achieved with the objective by having the number of resolvable points across the field coinciding with the number of pixels in the detector. The sample may be moved in a direction transverse to the scan line to obtain a full image of the sample or the line may be scanned across the sample accordingly.

Alternatively, the entire sample may be imaged, with the dimensional area of the detector and pupil corresponding to the area of the sample, at unity magnification. In this fashion, the double objective lens assembly simultaneously images the sample on substantially all of the sensing elements of the detector in two dimensions. This avoids having to move the sample or scan a line as described above.

A variety of imaging modes may be employed with the double objective lens design. For example, the light source may be configured for transillumination in which the double objective lens assembly is disposed proximate to one side of the sample and the light source is positioned proximate to an opposing side. This allows the double objective lens assembly to collect light passing through the sample and image the same on the detector. Alternatively, epi-illumination may be employed in which a wavelength separating means, such as a beam splitter, part-aperture-filling mirror or wavelength discrimination mirror may be disposed at the central pupil forming a retro-path over which light emitted from an illuminated area of the sample traverses. In this fashion, the light source is disposed off an optical axis defined by the double objective lens assembly. The light source directs light over the incident light path to impinge upon the wavelength separating means. The wavelength separating means directs the light through the sample lens and onto the sample. Light emerging from the sample is collected by the sample lens and directed along the retro-path through the wavelength separating means. The detector lens collects the light passing through the wavelength separating means and images the same upon the detector. In both of the aforementioned imaging systems, the detector produces electrical signals corresponding to the light sensed, and the system includes a signal processor and a video display system to form visual images of the signals.

BEST MODE FOR CARRYING OUT THE INVENTION

Figure 1:
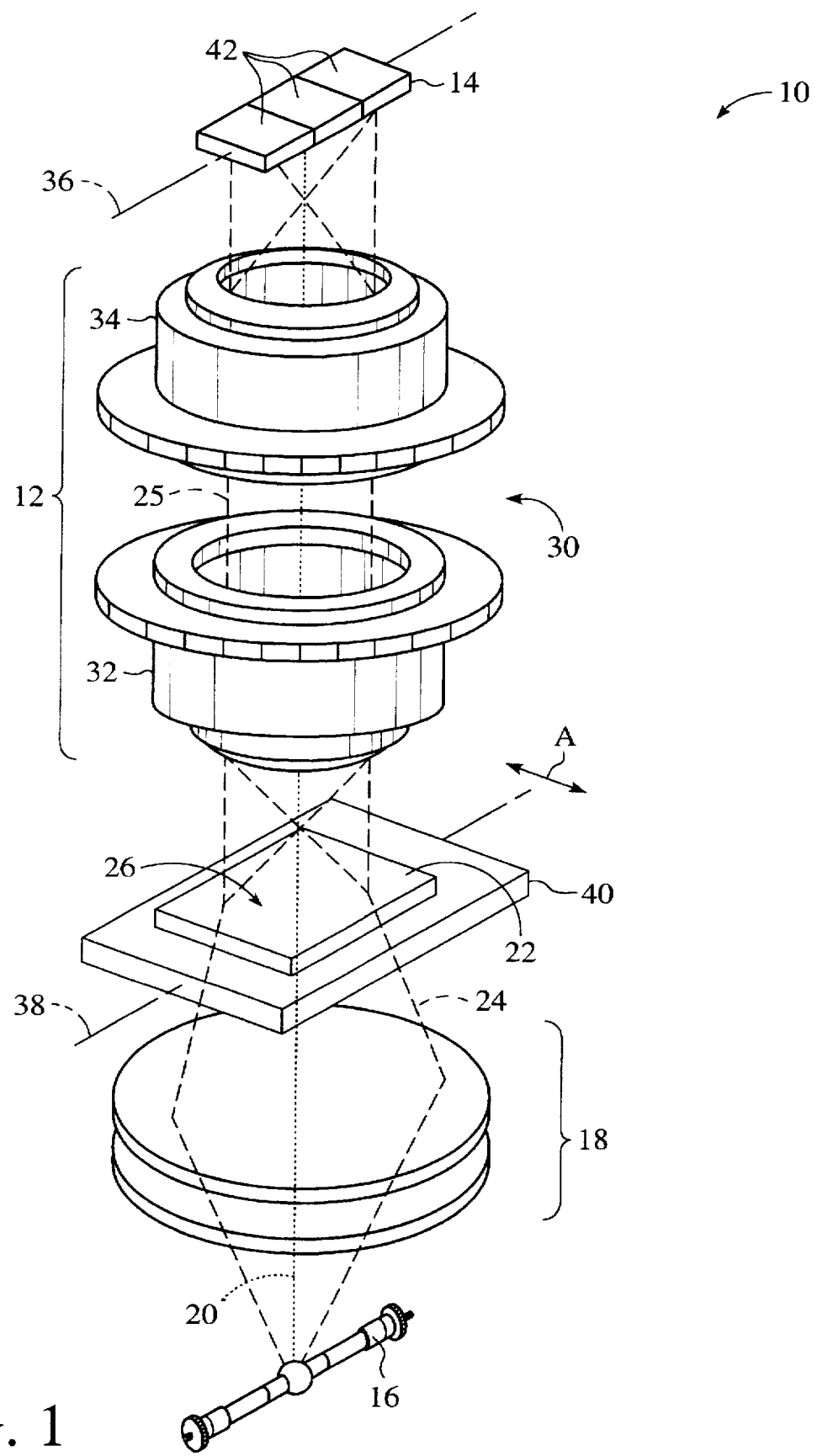
FIG. 1 is a perspective view of the present invention in a transillumination imaging system.

Referring to FIG. 1, a transillumination system 10 is shown as including a double objective lens assembly 12, optical detector 14, light source 16 and condenser lenses 18, all of which lie along an optical path 20. A sample 22 is disposed in optical path 20, between lens assembly 12 and light source 16. In this design, light 24 emitted from source 16 passes through sample 22 and is collected by lens assembly 12. Lens assembly 12 then directs the collected light 25 onto detector 14, imaging thereon an area 26 of sample 22 which is illuminated.

Figure 2:
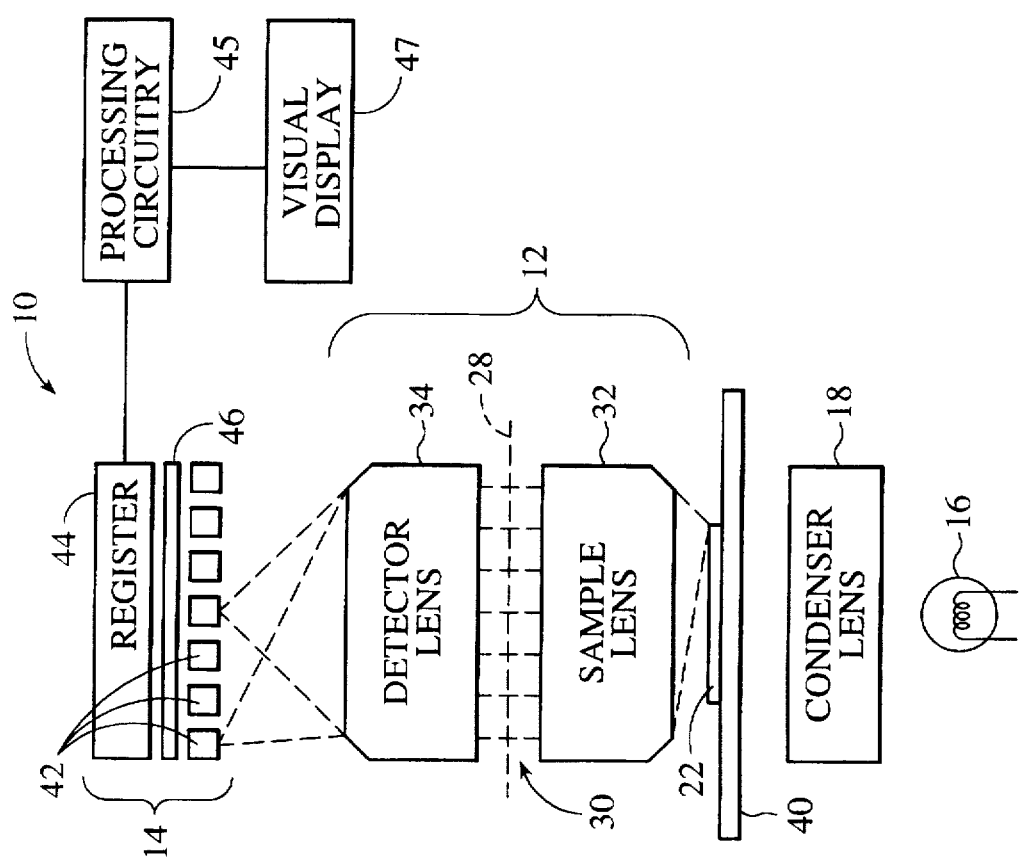
FIG. 2 is a side plan view of the system shown in FIG. 1.

Referring also to FIG. 2, double objective lens assembly 12 is corrected for axial and lateral chromatic aberrations and includes two infinite conjugate objective lenses. Each objective lens has a flat field and lateral color correction and an external pupil lying along a common axis and a common plane 28, defining a mechanically accessible central pupil 30 of system 10. One of the objective lenses, a sample lens 32, forms a focal plane proximate to sample 22. Detector 14 is positioned proximate to a focal plane formed by the remaining objective lens, the detector lens 34. It is preferred that system 10 be capable of providing full-field imaging of sample 22 in at least one dimension. To that end, detector 14 is typically an array detector having a plurality of sensing elements 42, e.g., photo-diodes, photo-capacitors or photo-conductors aligned along an axis. Although any type of array detector may be employed, such as an MOS readout, for purposes of discussion, detector 14 will be discussed as being a charge-coupled device (CCD). A dimension (d) of detector 14, along longitudinal axis 36, will be equivalent to or greater than a corresponding dimension (D) of sample 22 along a parallel axis 38. Considering that the diameter of central pupil 30 defines the numerical aperture of system 10, it is necessary that central pupil 30 allow a maximum quantity of photons therethrough to permit efficient imaging, so as to minimize optical loss. To that end, the pupil of both lenses 32 or 34 must meet the aforementioned criteria, but both pupils need not necessarily be the same size. More specifically, the double objective lens assembly 12 must satisfy the following criteria:

$$P_d \geq d; \text{ and}$$

$$P_d \geq P_s \Rightarrow \frac{f \times Na_d}{F \times Na_s} \geq 1$$

where $P_d$ is the pupil size of lens 34, $P_s$ is the pupil size of lens 32, f is the focal length of lens 34, F is the focal length of lens 32 and $Na_d$ and $Na_s$ are the respective numerical apertures of lens 34 and 32 and d is as defined above.

In one implementation, lens 32 and lens 34 may be identical, and, thus, form an optical relay of unity magnification. It is preferred that each lens 32 and 34 be afocal in the common plane 28 and be symmetric in design approach so that double objective lens assembly 12 is symmetric about central pupil 30. By having the pupils of two afocal lenses aligned along a common axis and lying in common plane 28, and containing symmetry in design, optical aberrations, such as coma and distortion, are reduced. To reduce optical loss at the periphery of the field, both lenses 32 and 34 may be telecentric in their respective focal planes, which renders assembly 12's magnification relatively insensitive to errors in focus position. In addition, lenses 32 and 34 may be achromatic or may have equal and opposite axial chromatic aberrations, allowing lens assembly 12 to operate over a broad band of wavelengths of light, e.g., the primary wavelength plus approximately 300 nm, or greater, while maintaining axial and lateral aberrations below the effective resolution of the system. This allows lens assembly 12 to operate with light of various wavelengths and to collect light from a wide variety of samples. Thus, any light source may be employed dependent upon the application. For example, light source 16 may be a laser that produces a collimated beam of coherent light, a halogen light or a light-emitting diode producing non-coherent light. This makes system 10 suitable for use in several applications, e.g., OBIC or chemoluminescence.

The specifications of lenses 32 and 34 are as follows:

|  | Sample Lens | Detector Lens |
| --- | --- | --- |
| Primary Wavelength | 488 | 488–600 |
| Focal Length (mm) | 27 | 27 |
| Field Size (cm) | 1 | 1 |
| Telecentricity (degrees) | 1 | 1 |
| Numerical Aperture | .2 | .2 |
| Resolution (microns) | 5 | 5 |
| Working Distance (mm) | 3 | 3 |
| Pupil Size (mm) | 10.8 | 10.8 |

As mentioned above, it is preferred that lens assembly 12 and detector 14 be configured to provide a full-field image of sample 22 along at least one dimension D. To image the entire sample 22, system 10 may include a translation stage 40 upon which sample 22 rests. The position of sample 22 on stage 40 is maintained in any convenient manner, e.g., vacuum suction or resilient members. Stage 40 moves sample 22 in a direction A transverse to axis 38, allowing successive striped areas of sample 22 to image upon sensing elements 42 of detector 14. In one implementation, sensing elements 42 of detector 14 may be connected to a single register 44 via transfer gate 46. In operation, a signal is integrated on sensing elements 42 for a line time. Gate 46 is then activated and the charge from all sensing elements 42 is simultaneously transferred to register 44. At which point, the register 44 is clocked to read out the charges to processing circuitry 45; the gate is deactivated; and stage 40 positions sample 22 so that the next area may be imaged on sensing elements 42. Processing circuitry 45 produces signals corresponding to the image sensed which is then transmitted to a visual display 47. In this fashion, the movement of stage 40 is synchronized with the integration and readout time of detector 14 so that the entire sample may be imaged upon sensing elements 42. Antiblooming may be provided in situations where the flux of light from source 16 is not easily controlled. Also, electronic shuttering may be employed which allows an integration time of sensing elements 42 to be less than the readout time for register 44. If a higher pixel density is required, a double-sided readout CCD or a staggered liner array CCD may be employed.

A particular advantage with the double objective lens assembly 12 is that the magnification of the system 10 may be easily adjusted without substantial optical loss. Adjustment of the magnification is achieved by merely changing the focal length of sample lens 32, while maintaining a constant distance between central pupil 30 and sample 22. For given focal lengths (f), of detector lens 34, and (F), of sample lens 32, the magnification (M) of system 10 can be defined as follows:

$$M = F/f = D/d \quad (1)$$

where (d) is the length of detector 14 along axis 36 which lies within the field of view of lens 34 and (D) is the length of sample 22 which lies in the field of view of lens 32 along parallel axis 38, as described above. Assuming a full-field of view at unity magnification, d corresponds to an area of detector 14, and D corresponds to an area of sample 22. Thus, if area D corresponds to 5 mm square of sample 22, then area d corresponds to 5 mm square of detector length, providing a one-to-one correspondence between detector area and sample area, i.e., unity magnification. The magnification of the system may be easily increased by increasing the ratio of detector area to sample area. Based upon equation (1), this ratio of detector area to sample area may be easily increased by simply changing the focal length of sample lens 32. Thus, sample lens 32 is releasably attached to system 10 so that it may be interchanged with other sample lens 32 to alter the magnification of system 10. The specifications for two embodiments of sample lens 32 providing non-unity magnification are as follows:

|  | Lens 1 | Lens 2 |
| --- | --- | --- |
| Primary Wavelength (nm) | 488–350 | 488–530 |
| Focal Length (mm) | 13.5 | 7 |
| Field Size (mm) | 5 | 3 |
| Telecentricity (degrees) | 1 | 1 |
| Numerical Aperture | .3 | .54 |
| Resolution (microns) | 2 | 1 |
| Working Distance (mm) | 2 | 1 |
| Pupil Size (mm) | 8.1 | 8 |

In an alternate embodiment, lens 32 may be a zoom lens which provides incremental, or continuous, adjustment of the focal length of the same.

An additional constraint on the lens assembly 12 is that the number of resolvable points in the field of view correspond to the number of sensing elements 42, i.e., pixels, on detector 14. For example, a typical two-dimensional CCD will consist of 26,200 pixels: 512×512. To ensure that lens assembly 12 provides 26,200 resolvable points at varying levels of magnification, lenses 32 and 34 would have to be configured to afford a constant image definition. To that end, lenses 32 and 34 are designed so that lens assembly 12 is defined as follows:

$$K = d/r$$

where K is a constant which is typically the number of sensing elements 42 in detector 14, d is the length of sample 22 which lies in the field of view of sample lens 32 and r is the resolution of lens assembly 12. By having lens assembly 12 provide a constant image definition, high definition imaging is achieved at all levels of magnification.

Figure 3:
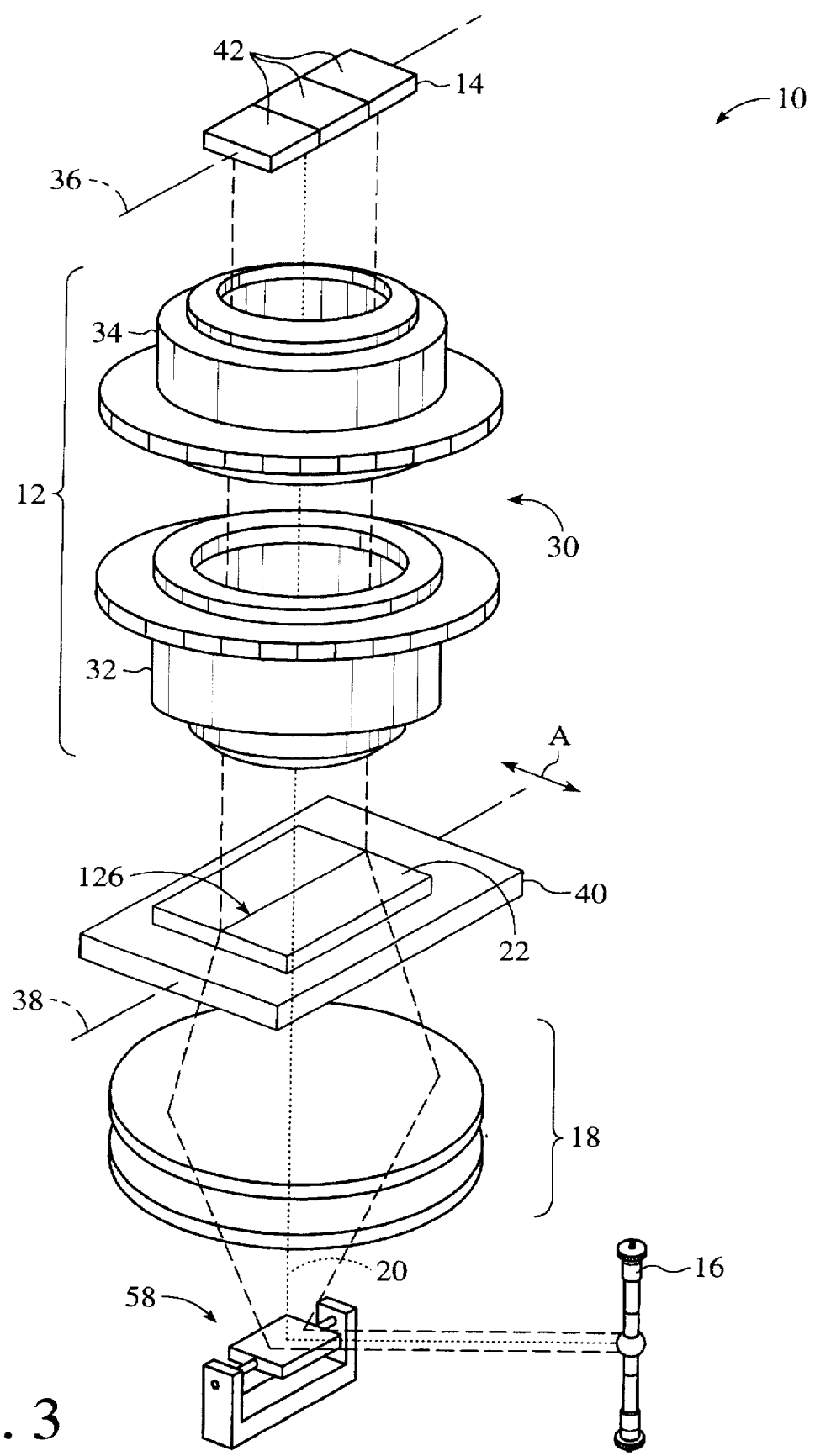
FIG. 3 is an alternate embodiment of the system shown in FIG. 1 employing a two-dimensional scanner.

Referring also to FIG. 3, system 10 may include a scanning mechanism 58, disposed between sample 22 and light source 16, with the position of stage 40 with respect to detector 14 remaining fixed. In this fashion, sample 22 may be illuminated with a scanning line. Any type of scanning mechanism could be employed, so long as a one dimensional scan is provided along direction A transverse to both axis 36 and 38. For example, scanning mechanism 58 could include a rotating planar, convex, concave or polygonal mirror, as well as a rotating holographic scanner, or oscillating prisms. Also, an acousto-optic deflector or a penta-prism scanning deflector may be employed. A benefit of illuminating sample 22 with a scan line is that uniform illumination of the sample 22 is easily achieved as compared to full-field imaging, because the illumination needs to be uniform in only one axis.

Figure 4:
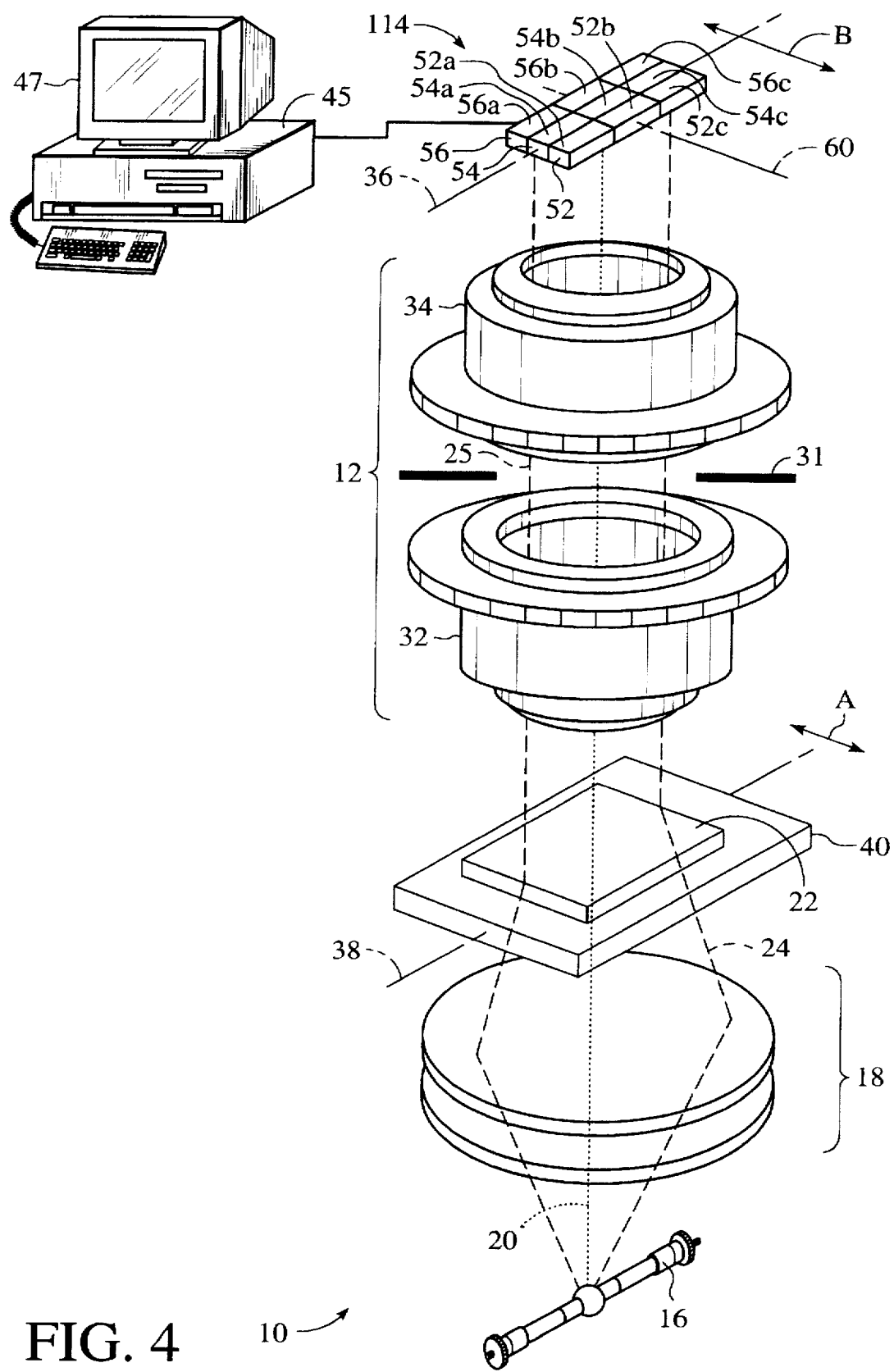
FIG. 4 is a perspective view of the system shown in FIG. 1 employing area-wise imaging.

Referring also to FIG. 4, a two-dimensional detector array 114 is shown providing a full-field image of sample 22 in two dimensions, which decreases imaging time of sample 22. One such detector is a frame transfer CCD image detector 114 that consists of a plurality of sensing elements 52a–c, 54a–c and 56a–c arranged in a plurality of rows 52, 54 and 56, respectively. Although three rows are shown, any number of rows and elements per row may be employed, dependent upon the application. Each row 52, 54 and 56 extends parallel to axis 38, orthogonally to direction A. The total area of sensing elements 52a–c, 54a–c and 56a–c may be at least as large as area 126 of sample 22 to be viewed under unity magnification. Electronic or mechanical shutter techniques may be employed with detector 214. To facilitate areawise imaging of sample 22 on detector 114, lens assembly 12 is structured so that the field of view of the same allows simultaneous imaging of the entire area of sample 22 onto detector 214.

In operation, shuttering is deactivated, allowing the entire area of detector 214 to be exposed to light 25. A charge is collected in each of sensing elements 242. Shuttering is activated and the charge collected in sensing elements 242 are clocked therefrom and sent to processing circuitry 245, creating signals corresponding to the image detected. Thereafter, a visual representation of the image may be formed on display 247.

In addition, a prism (not shown) or other wavelength dispersing mechanism may be disposed between lens 34 and detector 214. In this fashion, one axis of CCD detector 114, parallel to direction A, may provide spatial information concerning light detected, and axis 36, orthogonal thereto, provides wavelength information concerning the same.

To increase the signal-to-noise ratio of system 10, Time Delay Integration (TDI) techniques may be employed. For example, an area of the sample may be illuminated, but one row of pixels of the CCD would be activated to determine position information. TDI CCD 114 is oriented so that the parallel shift direction B is parallel to the direction A along which sample 22 is moved. Initially, light emerging from sample 22 is collected by lens 32 and directed onto row 52 of TDI CCD detector 114 by lens 34. As the sample 22 moves along direction A, light emerging therefrom images row 52, row 54 and then row 56 of TDI CCD detector 114. This information is transmitted to processing circuitry and used to form a visual representation of the image sensed by CCD 114 on a display, as discussed above.

Figure 6:
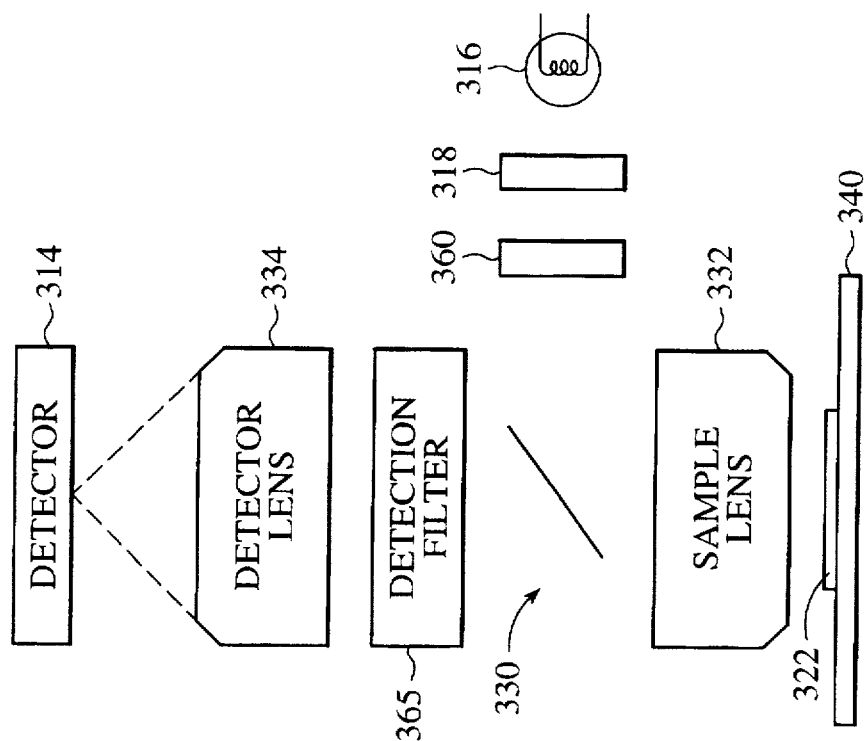
FIG. 6 is a side plan view of the system shown in FIG. 5.
Figure 5:
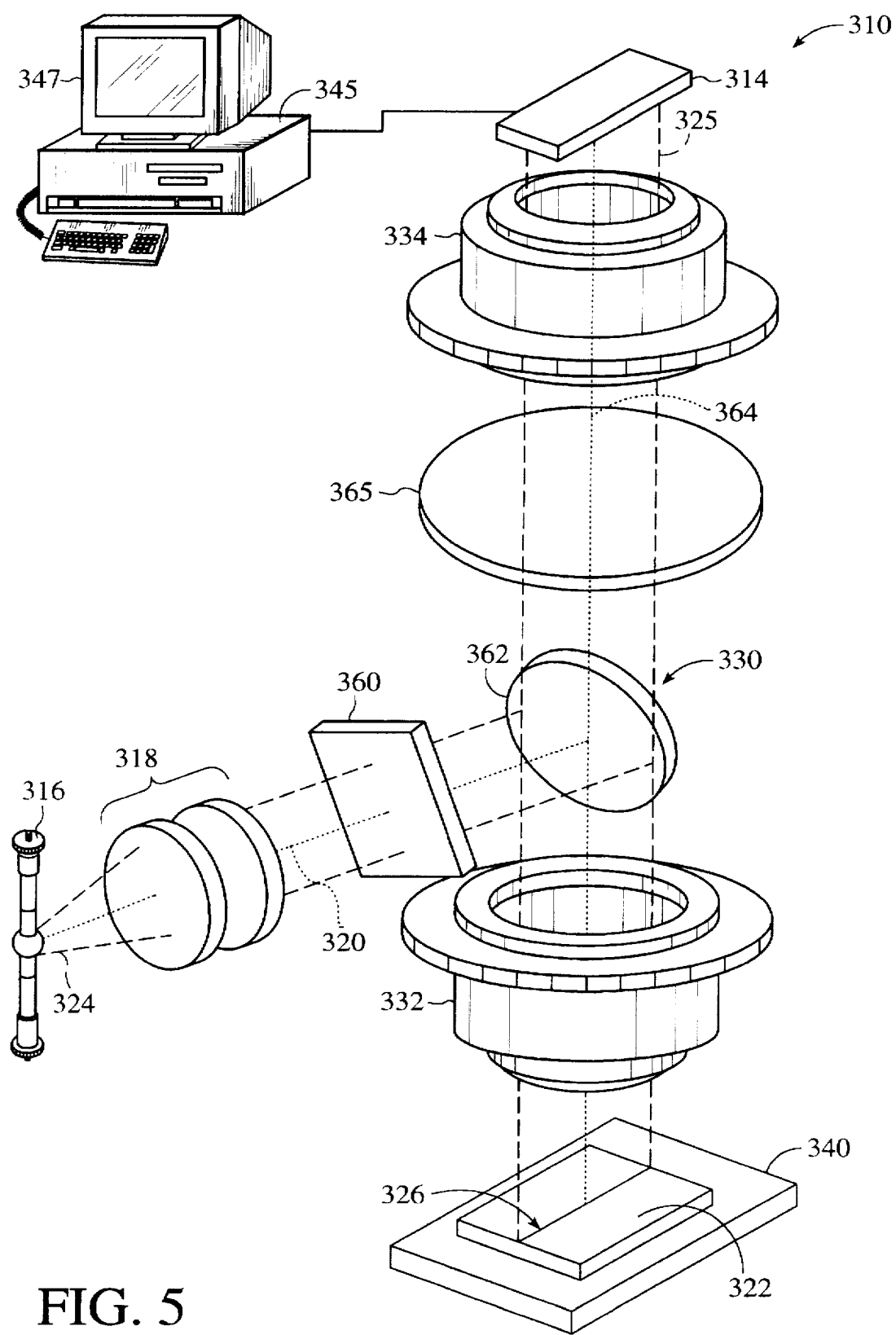
FIG. 5 is a perspective view of the present invention in an epi-illumination system.

Referring to FIGS. 5 and 6, the double objective lens assembly includes lenses 334 and 332 that form a central pupil 330, as discussed above with respect to FIGS. 1-4, and is included in a system 310 employing epi-illumination techniques. A light source 316 directs incident light 324 along an optical path 320 which passes through wave shaping optics, such as condenser lenses 318 and, optionally, an excitation filter 360. As discussed above, any light source may be employed dependent upon the application. For example, light source 316 may be laser that produces a collimated beam of coherent light, a halogen light or a light emitting diode producing non-coherent light. After passing through excitation filter 360, light 324 impinges upon a beam splitter 362 which fills central pupil 330 of double objective lens assembly. Beamsplitter 362 defines a retro-path 364 along which light emitted from sample 322 will travel, passing through detector lens 334 and imaging sample 322 onto detector 314. In this fashion, beam splitter 362 will separate light 324 from light 325 emitted from sample 322 so that light 324 reflected from sample 322 travels along path 320, but in an opposite direction. It is to be understood that any type of beamsplitter may be employed, so long as it is capable of separating incident light 324 from emitted light 325. For example, a dichroic filter, a fresnel reflector or a 50% beamsplitter may be employed. In addition, a polarization sensitive beamsplitter may be used to achieve the separation. This embodiment could include a ¼ waveplate positioned between the beamsplitter and the objective. This would cause incident beam 19 exiting the ¼ waveplate to be circularly polarized.

Sample lens 332 directs incident light 324 to illuminate an area 326 of sample 322, thereby stimulating the sample 322 to emit light. As before, area 326 should provide a full-field image in at least one dimension. To that end, area 326 may be a line which is either linear or arcuate that extends completely across sample 322 when lens assembly provides unity magnification. If lens assembly provides magnification greater than unity, area 326 will extend only partially across sample 322. Area 326 is imaged onto detector 314 by lens 332 collecting light 325 and directing the same through beamsplitter 362, detection filter 365 and lens 334. In this design, lens 332 affords coaxial illumination and collection. Lens 134 directs light 325 onto detector 314 where a visual representation is formed on display 347 by processing circuitry 345 as discussed above.

To image the entire sample 322 onto detector 314, sample 322 may be moved along a direction transverse to the longitudinal axis of area 126, as discussed above with respect to FIGS. 1 and 2. Alternatively, system 310 may include a scanning mechanism (not shown) which provides a one dimensional scan, as discussed above with respect to FIG. 3.

On the other hand, the entire sample 322 may be illuminated at a given time so that area 326 includes the entire sample 322. In this fashion, a two-dimensional detector array may be employed to reduce the imaging time of sample 322, as discussed above with respect to FIG. 4. Thus, system 310 is suitable for use in many applications, including fluorescence and reflection imaging.

From the foregoing discussion it can be seen that central pupil 30 can be used to accomplish various imaging modes used in microscopy applications. For instance, in reflection Nomarski DIC imaging a Wollaston prism is placed at the pupil of the system, a polarizer is placed in front of the excitation beam and an analyzer (2nd polarizer) is placed in front of the detector, with the imaging physics being the same as in a microscope.

Additionally, a pupil stop 31 may be placed at central pupil 30 as shown in FIG. 4. This improves intensity uniformity as a function of field position. Pupil stop 31 may be adjustable by using a common diaphragm type aperture so that more performance areas of the system can be controlled. By closing pupil stop 31 the system can be made less confocal and therefore the Z (axial) resolution will be decreased. Closing the diaphragm is also desirable if the amount of light from the sample overexposes the detector. Closing pupil stop 31 is beneficial when looking at a thick sample and when it is desirable to image a full volume in two dimensions with a single pass. Also, when imaging a monolayer sample in an automated system, it is desirable to decrease the intensity fall off errors with changes in Z position. This reduces the difficulty in positioning the sample.

I claim:

1. An optical system for imaging a sample, said system comprising, an optical detector;

a light source positioned to direct light along an optical path and illuminate an area of said sample, with said detector positioned to detect light corresponding to said area and produce corresponding electrical signals;

an objective lens assembly disposed in said optical path between said detector and said sample, said lens assembly including a first lens having a first focal plane defined by a focal length (F) of said first lens, with said sample being positioned proximate to said first focal plane, said first lens forming a first external pupil disposed opposite to said first focal plane; and a second lens having a second focal plane defined by a focal length (f) of said second lens, with said detecting being positioned proximate to said second focal plane, said second lens forming a second external pupil positioned opposite to said second focal plane, with each of said first and second external pupils being axially aligned and lying in a common plane, defining a central pupil, with said first and second lens defining a magnification (M) of said system as f/F; and means, coupled to receive said electrical signals, for forming a visual display of said area.

2. The optical scanning system of claim 1 wherein said objective lens assembly is adapted to provide a plurality of levels of magnification.

3. The optical scanning system of claim 2 wherein said lens assembly defines a field of view having a plurality of resolvable points, with said lens assembly being adapted to provide a constant number of resolvable points at each of said plurality of levels of magnification.

4. The optical scanning system of claim 3 wherein said detector includes a predetermined number of pixels, with said constant number of resolvable points coinciding with said predetermined number of pixels.

5. The optical scanning system of claim 4 further including means, in electrical communication with said detector, for processing said corresponding electrical signals to form a visual display of said area.

6. The optical scanning system of claim 5 wherein said sample includes first and second opposed majors surfaces, with said first lens positioned proximate to said first major surface and said light source is positioned proximate to said second major surface, thereby facilitating transmissive illumination of said sample.

7. The optical scanning system of claim 6 further including a wavelength separating means, positioned in said path at said the central pupil, for separating light from said source from light corresponding to said area, said separating means defining a retro-path over which fluorescent light corresponding to said area traverses.

8. The optical scanning system of claim 7 further including a detection filter positioned between said separating means and said second lens.

9. The optical system of claim 1 further including a pupil stop positioned at said central pupil.

10. The optical system of claim 1 wherein said sample has an outer perimeter and said area is coextensive with said outer perimeter, with said central pupil having sufficient dimensions to minimize optical loss by maximizing a quantity of photons that may pass therethrough, and said detector having sufficient dimensions to image the full field of view of said sample.

11. The optical system of claim 1 wherein both said first and second lenses are telecentric.

12. The optical scanning system of claim 1 wherein said detector is a charged-coupled device.

13. The optical scanning system of claim 1 wherein said detector is an array detector.

14. The optical scanning system of claim 1 wherein said detector is a MOS area array.

15. The optical scanning system of claim 1 wherein said detector includes an image sensing element from the group consisting of junction photodiode, MOS capacitor, pinned photo-diode or photoconductor.

16. The optical scanning system of claim 7 wherein said separating means is a dichroic filter.

17. The optical scanning system of claim 7 wherein said separating means is a fresnel reflector.

18. The optical scanning system of claim 7 wherein said separating means is a 50% beamsplitter.

19. The optical scanning system of claim 7 wherein said separating means is a polarization sensitive beamsplitter.

* * * * *